United States Patent [19]

Derrien

[11] 4,418,007
[45] Nov. 29, 1983

[54] PREPARATION OF MIXED OXIDE CATALYSTS COMPRISING THE OXIDES OF MOLYBDENUM AND/OR TUNGSTEN

[75] Inventor: Jean-Yves Derrien, Bourg-la-Reine, France

[73] Assignee: Rhone-Poulenc Industries, Paris, France

[21] Appl. No.: 310,399

[22] Filed: Oct. 9, 1981

[30] Foreign Application Priority Data

Oct. 10, 1980 [FR] France .............................. 80 21652

[51] Int. Cl.$^3$ .................. B01J 23/82; B01J 23/84; B01J 23/85; B01J 23/88
[52] U.S. Cl. .................. 502/312; 502/316; 502/319; 502/322
[58] Field of Search .................. 252/465, 469, 470

[56] References Cited

U.S. PATENT DOCUMENTS

| | | | |
|---|---|---|---|
| 3,624,146 | 11/1971 | Parthasarthy et al. | 252/470 X |
| 4,148,757 | 4/1979 | Brazdil et al. | 252/470 X |
| 4,166,808 | 9/1979 | Daumas et al. | 252/470 X |
| 4,212,766 | 7/1980 | Brazdil et al. | 252/470 X |

*Primary Examiner*—W. J. Shine
*Attorney, Agent, or Firm*—Burns, Doane, Swecker & Mathis

[57] ABSTRACT

Mixed oxide active catalysts having the formula:

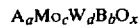

$A_a Mo_c W_d B_b O_x$ wherein:
A is at least one of the metals cobalt, nickel, manganese and/or lead;
B is at least one of the metals iron, bismuth, chromium and/or thallium;
a is the sum of the values indicating the amounts present of each of the metals A, and is a number ranging from greater than 0 to about 12;
c and d are numbers each equal to or greater than 0 and ranging to 12, with the sum c+d being about 12;
b is the sum of the values indicating the amounts present of each of the metals B, and is a number ranging from greater than 0 to about 1.5 [(c+d)−a]; and
x is a number satisfying all unbalanced valences, are prepared by, in a first stage, intimately admixing in aqueous phase the salts of all metals to comprise such active catalyst, with the salts of molybdenum and/or tungsten being ammonium salts and at least one salt of at least one of the metals A and B being a nitrate or a chloride whereby ammonia is added to an aqueous solution comprising the ammonium salts of molybdenum and/or tungsten in an amount sufficient to adjust the pH thereof to a value ranging from about 6 to 8 and then adding to the resulting solution simultaneously, a second aqueous solution comprising the A and B metal salts and sufficient ammonia to maintain the pH in the range of from about 6 to 8. The resulting suspension is then filtered with the recovered paste being dried and calcined.

20 Claims, No Drawings

PREPARATION OF MIXED OXIDE CATALYSTS COMPRISING THE OXIDES OF MOLYBDENUM AND/OR TUNGSTEN

BACKGROUND OF THE INVENTION

1. Field of the Invention

The present invention relates to the improved preparation of certain catalysts, and, more especially, to the improved preparation of catalysts based upon the oxides of molybdenum and/or tungsten.

2. Description of the Prior Art

Catalysts based upon the oxides of molybdenum and/or tungsten are per se known to the prior art. Same are useful, in particular, for the preparation of $\alpha,\beta$-unsaturated aldehydes by the oxidation of olefins in gaseous phase.

Thus, French Pat. No. 1,514,167 features certain catalysts for the preparation of unsaturated aldehydes via the air or oxygen oxidation of olefins, such as propylene and isopropylene, such catalysts having the following general formula:

$$Ni_aCo_bFe_cBi_dAs_eP_fMo_gO_h$$

wherein a ranges from between 0 and 20, b between 0 and 20 (a+b being between 0.5 and 20), c between 0.5 and 8, d between 0.1 and 7, e between 0 and 3, with f being less than 0.1, g equal to approximately 12, and h being between 36 and 98.

These catalysts are prepared by adding an aqueous solution of suitable water soluble salts of nickel, cobalt, iron and bismuth, and a suitable compound of arsenic and of phosphorus, to an aqueous solution of a suitable molybdate, such as ammonium molybdate. The resultant slurry is heated, with a support if so desired, to eliminate the water and to dry the solid cake that is formed. The solid cake is then calcined in air, at an elevated temperature. The "suitable" water soluble salts noted in the aforementioned patent are nickel nitrate, cobalt nitrate, ferric nitrate and bismuth nitrate, for example.

French Pat. No. 1,604,942 relates to the preparation of acrolein, which consists of oxidizing propylene in gaseous phase, with a gas containing oxygen and water vapor, in the presence of a catalyst based upon the oxides of molybdenum, bismuth, iron and cobalt, and having the following elemental composition: Mo, 40 to 67.7%; Bi, 1.9 to 21.7%; Fe, 1.6 to 6.5% and Co, 21.0 to 48.1%.

The process for the preparation of these catalysts described in the above-cited patent consists of adding, to a vigorously agitated aqueous solution of ammonium molybdate, an aqueous solution of iron, cobalt and bismuth nitrate. Subsequently, the water is eliminated and the resultant product is calcined, optionally on a support.

Another prior art reference, French Patent Application No. 72/20810, published under No. 2,147,933, features a process for the preparation of unsaturated compounds having carbonyl functions from olefins. According to this particular process, the catalytic oxidation is effected in the presence of a catalytic oxide, wherein the atomic proportions of the elemental components Co/Fe/Bi/W/Mo/Si/Ti/Z (Z=alkali or alkaline earth metal) are 2.0 to 20.0/0.1 to 10.0/0.1 to 10.0/0.5 to 10.0/2.0 to 11.5/0.5 to 15.0/0.005 to 3.0/0 to 3.0, with the proviso that W+Mo is equal to 12.0.

And these particular catalysts may be prepared by mixing aqueous solutions of ammonium molybdate and of ammonium p-tungstate, by adding to the mixture aqueous solutions of cobalt nitrate, ferric nitrate, bismuth nitrate, thallium nitrate, together with the aqueous solution of a hydroxide or nitrate of an alkali or alkaline earth metal. Subsequently, the water is evaporated and the product obtained is calcined, optionally on a support.

There is also known to the prior art, in French Patent Application No. 76/27531, published under No. 2,364,061, a catalyst based upon the oxides of cobalt, molybdenum, bismuth and iron, having the formula: $Co_aMo_{12}Fe_bBi_cO_x$, with a being between 8 and 10, b between 0.5 and 2, c between 0.5 and 2 and x satisfying the valences, wherein the active phase contains a phase corresponding to the formula $Bi_2Mo_2Fe_2O_{12}$. These catalysts make it possible to obtain, in very appreciably improved yields, $\alpha,\beta$-unsaturated aldehydes, for example, by oxidation of olefins.

These catalysts are prepared by reacting a solution of ammonium heptamolybdate and a solution of the nitrates of Co, Bi and Fe. The water is then evaporated and the resulting paste is dried. The solid obtained is subjected to a potential precalcination at approximately 450° C., a first calcination at a temperature between 450° C. and 500° C. for at least 5 hours, and then, after cooling in ambient air, to a second calcination under the same conditions as the first.

It will thus be appreciated that there exist a considerable number of references in the prior art describing the employment, in the oxidation of olefins (and particularly the oxidation of propylene to acrolein), of catalysts based principally upon the oxides of cobalt, iron, bismuth and molybdenum. A certain number of other oxides of metals too have been proposed as adjuvants to the base composition. It will also be appreciated that all of the processes for the preparation of these catalysts employ, in the first stage thereof, the reaction between ammonium heptamolybdate and the nitrates of iron, cobalt and bismuth.

During this reaction, ammonium nitrate is formed, which decomposes thermally at approximately 220° C. during subsequent calcination.

It is thus obvious that this thermal decomposition of ammonium nitrate poses serious practical and technical problems. In fact, those skilled in this art are very well aware that ammonium nitrate is an explosive compound and that, therefore, its handling on an industrial scale is quite dangerous.

In certain other processes there are also used, in place of the nitrates, certain metal chlorides, which enter the composition of the catalyst desired. In one such process, ammonium chloride, NH$_4$Cl, is formed, which, during thermal decomposition, sublimates at about 340° C. and is deposited in the form of a white powder in the process apparatus. The resulting clogging is obviously harmful during catalyst manufacturing operations.

It should also be emphasized that, in industrial practice, it is extremely difficult, if not impossible, to eliminate the simultaneous presence of ammonium salts and of ammonium salts and nitrates, and of chlorides.

Thus, serious need exists in the prior art for a process for the preparation of catalysts based, in particular, upon the oxides of molybdenum and/or tungsten, employing the reaction of at least one ammonium salt and at least one chloride and/or nitrate of the aforesaid metals, but wherein there is no danger, during the subsequent calcinations, of the thermal decomposition of ammonium nitrate and/or the sublimation of ammonium chloride.

SUMMARY OF THE INVENTION

Accordingly, a major object of the present invention is the provision of an improved process for the preparation of molybdenum/tungsten oxide catalysts devoid of those disadvantages and drawbacks to date plaguing the state of this art, which catalysts comprising an active phase having the general formula:

$$A_a Mo_c W_d B_b O_x$$

wherein:
(i) A represents at least one metal selected from the group comprising cobalt, nickel, manganese, and lead;
(ii) B represents at least one metal selected from the group comprising iron, bismuth, chromium, and thallium;
(iii) a represents the sum of the indices assigned to each of the metals A; it is greater than 0 and less than or equal to approximately 12;
(iv) c and d are each greater than or equal to 0 and less than or equal to 12; with their sum c+d being equal to approximately 12;
(v) b represents the sum of indices assigned to each of the metals B; it is greater than 0 and less than or equal to approximately 1.5 [(c+d)−a]; and
(vi) x is a value satisfying the several valences;

and the subject process comprising, in a first stage, in an aqueous phase, intermixing the salts of the metals entering into the final composition of the active phase, with the molybdenum and/or the tungsten being in the form of ammonium salts and at least one of the metals A and B being in the form of a nitrate or a chloride; in a second stage, the resulting paste is dried; and, in a third stage, at least one calcination is effected upon the solids thus obtained, optionaly while deposited on a support, said process being characterized in that, in the first stage, to a first aqueous solution containing the ammonium salts of molybdenum and tungsten in amounts such as to obtain the desired values of c and d, there is added ammonia in an amount sufficient to adjust the pH of the solution to a value ranging from approximately 6 to approximately 8; that, to the solution which results, there are simultaneously added, on the one hand, a second aqueous solution containing the salts of A and B in amounts such as to obtain the desired values of a and b, and, on the other hand, ammonia, such as to maintain the pH at a value ranging from approximately 6 to approximately 8; and that, the solution which thus results is filtered to obtain the said second stage paste.

DETAILED DESCRIPTION OF THE INVENTION

More particularly according to this invention, a primary attribute thereof is that, when the first and second aqueous solutions are admixed with each other under the aforesaid conditions of pH, the precipitation of a solid based upon the entirety of the metals employed is promoted, while the ammonium nitrate and/or ammonium chloride resulting from the presence of ammonium, nitrate and chloride ions in the two solutions, remain in solution. Thus, upon completion of the addition, there exists a solid phase containing no ammonium nitrate and/or ammonium chloride, which after drying and calcination(s) yields the catalyst desired and, on the other hand, there results an aqueous phase principally containing the ammonium nitrate and/or the ammonium chloride formed and, equally, trace amounts of the metals constituting the final composition of the desired catalyst.

As the ammonium salts that may be used in the process according to the invention, ammonium heptamolybdate is specifically mentioned. The latter may be used either in the form of crystallized ammonium heptamolybdate, or in the form of a mixture of ammonium dimolybdate and molybdic anhydride. When the first aqueous solution contains only ammonium heptamolybdate in one of the aforenoted forms, its pH is approximately 5.4.

As the ammonium salt of tungsten, ammonium paratungstate is preferred.

When the first aqueous solution contains only ammonium paratungstate, its pH is approximately 5.8.

When a mixture of ammonium paratungstate and ammonium heptamolybdate is present, the pH varies from approximately 5.4 to 5.8, depending upon the relative proportions of the respective components.

According to one preferred embodiment of the invention, there are employed a first aqueous solution exclusively containing ammonium heptamolybdate and a second aqueous solution containing as the metal A, cobalt, and as the metal B, iron and bismuth, in amounts sufficient to obtain the desired catalytic formula, wherein a ranges from approximately 8 to approximately 10, c is equal to 12 and b ranges from approximately 1 to approximately 4.

The pH obtained after the addition of ammonia to the first aqueous solution and maintained during the addition of the second aqueous solution, must be greater than approximately 6, in order to insure the precipitation of the cobalt, nickel, manganese and lead. In effect, at pH values of less than 6, and if the metals of Group B precipitate, the metals of such Group B precipitate only very imperfectly, or indeed not at all.

The addition of ammonia to obtain a pH higher than 8 is not justified technically or economically to the extent that at a pH>8, certain redissolution phenomena are observed.

Even more particularly according to the invention, the two aqueous solutions of molybdenum, on the one hand, and of iron, bismuth and cobalt on the other, are used in amounts such that there results a catalyst wherein a is equal to approximately 10, c is equal to approximately 12 and b is equal to approximately 2.

According to another embodiment of the invention, following the completion of the simultaneous addition of the second aqueous solution and of ammonia, the suspension obtained may be heated to a temperature ranging from approximately 20° to approximately 100° and is maintained at this temperature for approximately 1 hour to 48 hours.

This heat treatment makes it possible to effect the precipitation of the metals of Group A and B and of molybdenum and/or tungsten. During this optional phase of the process, the evaluation of the pH may be assisted; it may decrease slightly.

It is clear that the higher the temperature of this heat treatment, the shorter the period of the suspension need be maintained at this temperature.

Preferably, the temperature is maintained at about 60° C. for about 4 hours.

The ammonia added to both the first aqueous solution and simultaneously to the second aqueous solution is, preferably, an aqueous solution containing from approximately 50 to approximately 250 g ammonia per liter of solution.

Even more preferably, the operation is conducted with a solution containing 160 g ammonia/liter.

As indicated hereinabove, the catalysts obtained according to the process of the invention are particularly useful in obtaining acrolein via the air oxidation of propylene.

In order to further illustrate the present invention and the advantages thereof, the following specific examples are given, it being understood that same are intended only as illustrative and in nowise limitative.

EXAMPLE 1

Preparation of $Co_{10.3}Mo_{12}Fe_{1.06}Bi_{1.06}O_x$

A first aqueous solution of ammonium heptamolybdate was prepared by dissolving 167.6 g of $(NH_4)_6Mo_7O_{24}.4H_2O$, in 760 cm$^3$ $H_2O$ at ambient temperature. To this solution, 52 ml ammonia (d=0.935, 160 g $NH_3$ per liter) were added such as to adjust the pH to 6.9.

To the resulting solution, a second aqueous solution was added, prepared by mixing together:
(i) 38.4 g of $Bi(NO_3)_3.5H_2O$ in 28.5 cm$^3$ $H_2O$ acidified with 4.5 cm$^3$ nitric acid;
(ii) 32.1 g of $Fe(NO_3)_3.9H_2O$ in 25 cm$^3$ $H_2O$; and
(iii) 230.0 g of $Co(NO_3)_2.6H_2O$ in 150 cm$^3$ $H_2O$,
while simultaneously adding a total volume of 39 ml ammonia (d=0.935) such as to maintain throughout the addition of the second aqueous solution the pH at a value ranging from about 6.9 to 7.

The solution obtained was heated to 60° C. and this temperature was maintained for 4 hours, followed by cooling.

The mixture was filtered and washed with one liter of water.

The precipitate was dried overnight at 120° C.; 229 g of solids were obtained, which after calcination at 400° C. for 6 hours had a weight of 215 g and the elemental composition, $Co_{10.3}Mo_{12}Fe_{1.06}Bi_{1.06}O_x$. This solid may be ground, deposited onto a support and calcined by methods per se known to the prior art.

The filtrate was analyzed: it contained 156.3 g $NH_4NO_3$, 1.42 g Co expressed in metallic form, 5.5 g molybdenum, 6 mg bismuth and 6 mg Fe, again expressed in metallic form.

EXAMPLE 2

Preparation of $Co_{10.5}Mo_{12}Fe_{1.05}Bi_{1.05}O_x$

The procedure of Example 1 was repeated, but the pH of the ammonium heptamolybdate solution was adjusted to 7.5 and 114 ml of ammonia (d=0.935) was used.

Simultaneously, to the second aqueous solution, there was added a total volume of 53 ml ammonia (d=0.935) such as to maintain the pH at 7.5.

The solution was filtered without conducting the heat treatment.

The precipitate obtained was dried overnight at 120° C. and same weighed 236.5 g. After calcination at 400° C., its weight was 211 g and its composition was $Co_{10.5}Mo_{12}Fe_{1.05}Bi_{1.05}O_x$.

The filtrate contained 160.6 g $NH_4NO_3$, 0.34 g cobalt, 4.8 g molybdenum expressed in metallic form. No iron or bismuth was detected.

EXAMPLE 3

Preparation of $Co_9Mo_{12}Bi_{1.7}Fe_{1.7}O_x$

To an aqueous solution of ammonium heptamolybdate similar to that used in Example 1, 114 ml ammonia (d=0.935) were added to adjust the pH to 7.5.

To this solution, a second aqueous solution was added, and second solution being prepared by mixing together:
(i) 65.8 g of $Bi(NO_3)_3.5H_2O$ in 50 cm$^3$ water and 7 cm$^3$ nitric acid;
(ii) 54.77 g of $Fe(NO_3)_3.9H_2O$ in 90 cm$^3$ water; and
(iii) 197.25 g of $Co(NO_3)_2.6H_2O$ in 85 cm$^3$ water;
while adding a total volume of 45 ml ammonia (d=0.935) such as to maintain the pH at 7.5.

The precipitate obtained, dried overnight at 120° C., weighed 245.5 g. After calcination at 400° C. for 6 hours, the weight of the precipitate was 216.3 g. The composition was $Co_9Mo_{12}Bi_{1.7}Fe_{1.7}O_x$.

The filtrate contained 171.7 g $NH_4NO_3$, 0.30 g cobalt and 4.8 g molybdenum expressed in metallic form. No iron or bismuth was detected.

EXAMPLE 4

Preparation of $Co_7Mo_{12}Bi_1Fe_1O_x$ the procedure of Example 3 was repeated, but the pH of the first aqueous solution of ammonium heptamolybdate was adjusted to 6.4 with 20 cm$^3$ ammonia (d=0.935).

This pH value was maintained by adding to the resulting solution the second aqueous solution of Example 3 and, simultaneously, a total volume of 50 ml ammonia (d=0.935).

The precipitate obtained was dried overnight at 120° C. and weighed 215 g. After calcination at 400° C., its weight was 190 g and its composition was $Co_7Mo_{12}Bi_1Fe_1O_x$.

The filtrate contained 164 g of $NH_4NO_3$, 8.4 g cobalt and 2.6 g molybdenum expressed in metallic form. No iron or bismuth was detected in the filtrate.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of a mixed oxide active catalyst having the formula:

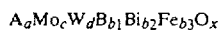

$$A_aMo_cW_dB_{b1}Bi_{b2}Fe_{b3}O_x$$

wherein:
A is at least one of the metals selected from nickel, cobalt, manganese and lead;
B is at least one of the metals selected from chromium and thallium;
a is the sum of the values indicating the amounts present of each of the metals A, and is a number ranging from greater than 0 to about 12;
c and d are numbers each equal to or greater than 0 and ranging to 12, with the sum c+d being about 12;

$b_1$ is the sum of the values indicating the amounts present of each of the metals B and can be zero or greater, $b_2$ and $b_3$ are greater than zero, and the sum of $b_1+b_2+b_3$ is a number ranging from greater than 0 to about $1.5 [(c+d)-a]$; and x is a number satisfying all unbalanced valences, said process comprising, in a first stage, intimately admixing in aqueous phase the salts of all metals to comprise such active catalyst, with the salts of molybdenum and/or tungsten being ammonium salts and at least one salt of at least one of bismuth, iron and the metals A and B being a nitrate or a chloride, and further wherein in such first stage said intimate admixing comprises successively adding to a first aqueous solution comprising said ammonium salts of molybdenum and/or tungsten in amounts sufficient to satisfy the values c and d, an amount of ammonia sufficient to adjust the pH thereof to a value ranging from about 6 to 8, next adding to the solution which results a second aqueous solution comprising said bismuth salts, iron salts and A and B metal salts in amounts sufficient to satisfy the values a, $b_1$, $b_2$ and $b_3$ and, simultaneously, also adding thereto an amount of ammonia sufficient to maintain the pH of the combined solution at a value ranging from about 6 to 8, and thence filtering the suspension which results to obtain a paste of the desired active catalyst; and, in a second stage, then drying said paste and, at least once, calcining same.

2. The process as defined by claim 1, wherein said first aqueous solution comprises only ammonium heptamolybdate.

3. The process as defined by claim 1, wherein said first aqueous solution comprises only ammonium paratungstate.

4. The process as defined by claim 1, wherein said first aqueous solution comprises a mixture of ammonium heptamolybdate and ammonium paratungstate.

5. The process as defined by claim 1, further wherein, upon completion of the simultaneous addition of the second aqueous solution and the ammonia, the resulting suspension is heated to a temperature ranging from about 20° C. to about 100° C. for from about 1 hour to about 48 hours.

6. The process as defined by claim 5, wherein the resulting suspension is heated to about 60° C. for about 4 hours.

7. The process as defined by claim 1, wherein the ammonia is added as an aqueous solution containing from about 50 to about 250 g ammonia per liter of solution.

8. The process as defined by claim 7, wherein said aqueous ammoniacal solution contains from about 160 g ammonia/liter.

9. The process as defined by claim 1 or 2, wherein said first aqueous solution comprises ammonium heptamolybdate, and said second aqueous solution comprises cobalt, iron and bismuth salts in amounts such that a will range from about 8 to 10, the sum of $b_1+b_2+b_3$ from about 1 to 4, and c will be about 12.

10. The process as defined by claim 9, wherein a will be about 10 and the sum of $b_1+b_2+b_3$ about 2.

11. A process for the preparation of a mixed oxide active catalyst having the formula:

$A_{a_1}Co_{a_2}Mo_cW_dB_bO_x$ wherein:

A is at least one of the metals selected from nickel, manganese and lead;

B is at least one of the metals selected from iron, bismuth, chromium and thallium;

$a_1$ is the sum of the values indicating the amounts present of each of the metals A and can be zero or greater, $a_2$ is greater than zero, and the sum of $a_1$ and $a_2$ is a number ranging from greater than 0 to about 12;

c and d are numbers each equal to or greater than 0 and ranging to 12, with the sum c+d being about 12;

b is the sum of the values indicating the amounts present of each of the metals B, and is a number ranging from greater than 0 to about $1.5 [(c+d)-(a_1+a_2)]$; and x is a number satisfying all unbalanced valences, said process comprising, in a first stage, intimately admixing in aqueous phase the salts of all metals to comprise such active catalyst, with the salts of molybdenum and/or tungsten being ammonium salts and at least one salt of at least one of cobalt and the metals A and B being a nitrate or a chloride, and further wherein such first stage said intimate admixing comprises successively adding to a first aqueous solution comprising said ammounium salts of molybdenum and/or tungsten in amounts sufficient to satisfy the values c and d, an amount of ammonia sufficient to adjust the pH thereof to a value ranging from about 6 to 8, next adding to the solution which results a second aqueous solution comprising said cobalt salt and A and B metal salts in amounts sufficient to satisfy the values $a_1$, $a_2$ and b and, simultaneously, also adding thereto an amount of ammonia sufficient to maintain the pH of the combined solution at a value ranging from about 6 to 8, and then filtering the suspension which results to obtain a paste of the desired active catalyst; and, in a second stage, then drying said paste and, at least once, calcining same.

12. The process as defined by claim 11, wherein said first aqueous solution comprises only ammonium heptamolybdate.

13. The process as defined by claim 11, wherein said first aqueous solution comprises only ammonium paratungstate.

14. The process as defined by claim 11, wherein said first aqueous solution comprises a mixture of ammonium heptamolybdate and ammonium paratungstate.

15. The process as defined by claims 11 or 12, wherein said first aqueous solution comprises ammonium heptamolybdate, and said second aqueous solution comprises cobalt, iron and bismuth salts in amounts such that the sum of $a_1+a_2$ will range from about 8 to 10, b from about 1 to 4, and c will be about 12.

16. The process as defined by claim 15, wherein the sum of $a_1+a_2$ will be about 10 and b about 2.

17. The process as defined by claim 11, further wherein, upon completion of the simultaneous addition of the second aqueous solution and the ammonia, the resulting suspension is heated to a temperature ranging from about 20° C. to about 100° C. for from about 1 hour to about 48 hours.

18. The process as defined by claim 17, wherein the resulting suspension is heated to about 60° C. for about 4 hours.

19. The process as defined by claim 11, wherein the ammonia is added as an aqueous solution containing from about 50 to about 250 g ammonia per liter of solution.

20. The process as defined by claim 19, wherein said aqueous ammoniacal solution contains about 160 g ammonia/liter.

* * * * *